United States Patent [19]
Heide

[11] 3,916,623
[45] Nov. 4, 1975

[54] DEVICE FOR CONTROL OF PROCESSES THAT DEPEND ON ENGINE TEMPERATURE IN AN AUTOMOTIVE INTERNAL COMBUSTION POWERPLANT

[75] Inventor: Horst Heide, Bad Friedrichshall, Germany

[73] Assignee: Audi NSU Auto Union Aktiengesellschaft, Neckarsulm, Germany

[22] Filed: Sept. 11, 1973

[21] Appl. No.: 396,234

[30] Foreign Application Priority Data
Sept. 19, 1972 Germany............................ 2245885

[52] U.S. Cl. .......... 60/288; 23/288 FA; 123/122 D; 165/39; 236/102
[51] Int. Cl.² ......................................... F01N 3/14
[58] Field of Search...................... 60/288, 287, 286; 23/288 FA; 236/93, 102, 101 A, 101 C, 101 R; 165/39; 123/122 D, 122 H, 124 A

[56] References Cited
UNITED STATES PATENTS

| | | | |
|---|---|---|---|
| 1,864,375 | 6/1932 | Root | 123/122 H |
| 2,037,486 | 4/1936 | Rogers | 123/124 A |
| 2,792,180 | 5/1957 | Flagg | 236/102 |
| 2,837,893 | 6/1958 | Schirmer | 60/39.23 |
| 3,793,830 | 2/1974 | August | 60/288 |
| 3,813,226 | 5/1974 | Heitland | 23/288 FA |
| 3,814,589 | 6/1974 | Heitland | 60/288 |
| 3,820,327 | 6/1974 | Henault | 60/286 |

*Primary Examiner*—Douglas Hart
*Attorney, Agent, or Firm*—Kane, Dalsimer, Kane, Sullivan and Kurucz

[57] ABSTRACT

An automotive internal combustion powerplant includes an exhaust system with two pipes displaceable longitudinally relative to each other. A control means is interposed between adjoining ends of the pipes when the pipes are heated by the exhaust gases they shift relative to one another. This movement is utilized as a control for exhaust gas decontamination.

1 Claim, 6 Drawing Figures

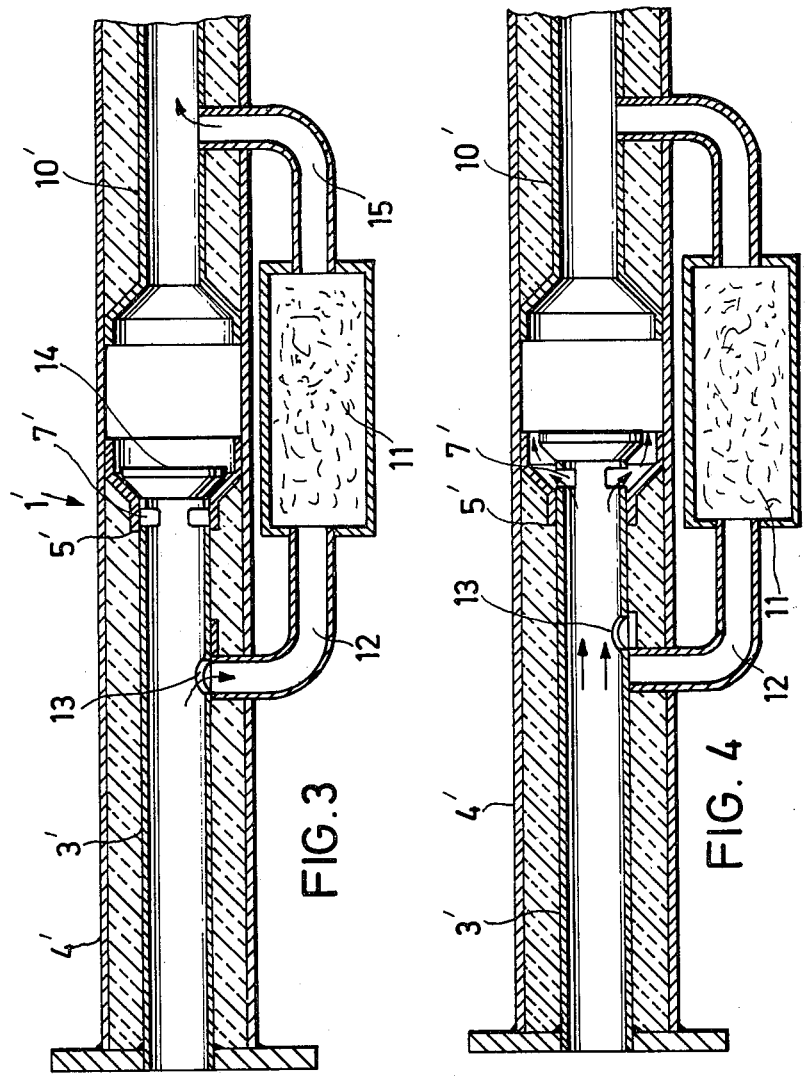

DEVICE FOR CONTROL OF PROCESSES THAT DEPEND ON ENGINE TEMPERATURE IN AN AUTOMOTIVE INTERNAL COMBUSTION POWERPLANT

BACKGROUND OF THE INVENTION

In automotive internal combustion powerplants, there are a number of processes that are to be controlled according to engine temperature. Some processes have to be stopped when a certain temperature has been reached. In the field of exhaust gas decontamination, for example, the following exemplary thermal or catalytic reactors must be brought to the high temperature required for afterburning as soon as possible after starting of the engine. This is accomplished, for example, by means of so-called flame arrestors, ordinarily of screen construction placed in the flow of the exhaust and heated very rapidly. Such flame arrestors create considerable flow resistance, reducing the power output of the engine. Accordingly, it is desired to reduce this flow resistance as much as possible as soon as the reactor has reached its working temperature.

The service of catalytic reactors, which likewise entail considerable flow resistance, is again required only for a comparatively short time after starting of the cold engine. In this case also it is desired to remove the catalytic reactor from the exhaust gas flow when the exhaust system has reached a certain temperature.

Together with afterburners in thermal reactors, it is likewise known that a special combustion chamber may be provided which is supplied with a fuel mixture and equipped with a sparkplug, for purposes of afterburning immediately after starting of the engine, while the walls of the thermal reactor have not yet reached the temperature required for the afterburner reaction. When that temperature has been reached, this combustion chamber may be put out of operation.

Another contribution to exhaust decontamination consists in supplying a preheated fuel-air mixture while the engine is cold, to improve combustion, which is incomplete during that period. This procedure, however, reduces the volumetric efficiency of the plant, so that it is expedient to discontinue heating as soon as the engine has reached operating temperature.

SUMMARY OF THE INVENTION

The object of the invention is to reliably and inexpensively control processes of the foregoing type that are required to be stopped a certain period of time after starting an internal combustion engine, and thus as a function of engine temperature.

This object is effectively attained, according to the invention, by an automotive internal combustion powerplant whose exhaust system has two pipes displaceable longitudinally relative to each other. In this connection, a control means is interposed and includes two parts movable relative to each other, one part being attached to one pipe and the other part to the other pipe. When these pipes are heated by the exhaust gases from an initial cold condition until operating temperature is reached, then will shift relative to each other by as much as several centimeters because of heat expansion. This movement is utilized as the control for the processes contemplated by this invention.

The two pipes may form part of a thermal reactor, and accordingly be thrust one into the other upon heating. The two pipes may be fixed at their ends away from each other, with the control means being arranged in the vicinity where the two adjoining pipe ends meet. Since the pipes will then expand in opposed directions, the shift displacement will be as long as possible.

The control means consists of a segment of the inner pipe together with a member attached to the outer pipe. The control means embraces a throttling zone for the exhaust with its cross-section being enlarged with increasing temperature and consequent relative displacement of the pipes. A flame arrestor may be arranged at the end of the inner pipe, while the segment of this pipe forming one part of the control means is provided with exhaust gas orifices which are covered by the member attached to the outer pipe until a certain temperature of the pipes has been reached. At that temperature, the throttle will have been enlarged enough so that the flow resistance will be substantially reduced.

The thermal reactor may alternatively be combined with a catalytic afterburning means. The control means in this case operates in shutting off the catalytic afterburning means when a certain temperature has been reached. For this purpose, at least one by-pass line with a catalytic afterburning means branches off ahead of the throttling zone in the direction of flow of the exhaust. As long as the pipes have not yet reached their operating temperature, the cross-section of the throttling zone is small, so that the exhaust gases flow predominantly through the catalytic afterburning system. At operating temperature, the cross-section of the throttling zone has enlarged sufficiently so that the flow resistance of the catalytic afterburning system is considerably greater than that of the throttling zone whereupon the exhaust gases will no longer flow through the catalyst. In addition to a reduction of the exhaust backpressure, this results in longer life of the catalyst. The relative shift of the two pipes may also be utilized to shut off the catalyst completely when a certain temperature is reached. In this regard, the by-pass line is connected to the outer pipe and is in communication with the inner pipe. The exhaust gases are directed through orifices in the wall of the inner pipe, and these orifices being progressively throttled down as the temperature rises, owing to the relative shifting of the pipes.

If the engine has a heating means for the intake system, the control means may be connected with this heating means so as to shut if off when a certain relative displacement of the two pipes has occurred. The heating means may comprise an annular space surrounding the two pipes which is in communication with the atmosphere and also with the intake air filter by way of the control means. While running hot, the engine will take in both cold air from the atmosphere and preheated air through the annular space, until the control means breaks the connection between the intake air filter and the annular chamber.

BRIEF DESCRIPTION OF THE DRAWINGS

Further details and features of the invention will appear from the following description in conjunction with the drawings, showing some embodiments of the invention by way of example.

In the drawings:

FIG. 3 shows a longitudinal section of a thermal exhaust reactor combined with a catalytic afterburning means and having a temperature governed control means, passing the exhaust flow through the catalyst in cold condition of the reactor;

FIG. 4 shows the arrangement of FIG. 3 in hot operating condition, shutting off the catalyst;

DETAILED DESCRIPTION OF THE DRAWINGS

Figure 1:
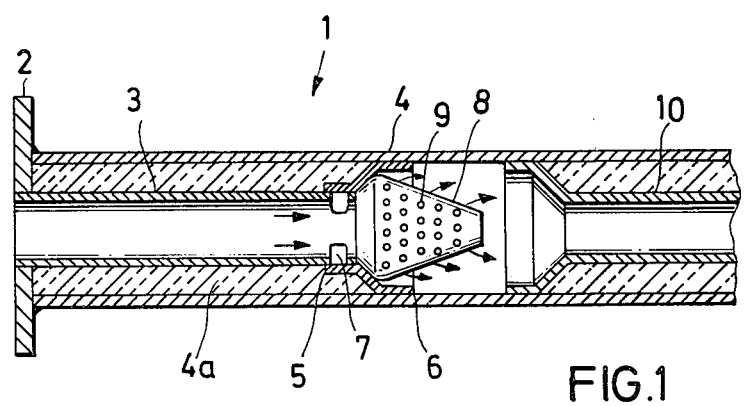
FIG. 1 shows a longitudinal sector of the inlet end of a thermal exhaust reactor having a temperature governed exhaust flow control means, in cold condition.

Referring initially to FIG. 1, one part of a thermal exhaust reactor 1 is shown attached by a flange 2 to the housing of an engine. The reactor 1 has an inner pipe 3 in communication with the engine exhaust and surrounded by an outer pipe 4. Heat insulation 4a is provided between inner pipe 3 and outer pipe 4. Pipes 3 and 4 are fixed to flange 2 at their left-hand end as viewed in the drawing. Near its other end, the inner pipe 3 is slidable in a cylindrical continuation 5 of a funnel-shaped member 6 attached to the outer pipe 4. The inner pipe 3 is provided near its right-hand end with orifices 7, which when the reactor is cold (FIG. 1) match and are covered by the cylindrical continuation 5. A pear-shaped flame arrestor 8 is attached to the inner end of the pipe 3, having a plurality of orifices 9 for the exhaust gas.

So long as the inner pipe 3 has not yet reached its operating temperature, the orifices 7 are covered by the cylindrical continuation 5, and the exhaust can flow only through the perforations 9 in the flame arrestor 8. As a result, the flame arrestor 8 is heated very rapidly, enabling the afterburning to begin very soon after starting. At the same time, the flame arrestor 8 creates considerable flow resistance.

The inner pipe 3 is gradually heated by the hot exhaust, so that it expands towards the right in the drawing. When the inner pipe 3 has reached its operating temperature, at which afterburning can take place, the inner pipe 3 has shifted enough so that the orifices 7 are clear of the cylindrical continuation 5, and the exhaust can now pass through these orifices 7 into the following exhaust system 10 with no major flow resistance.

Figure 2:
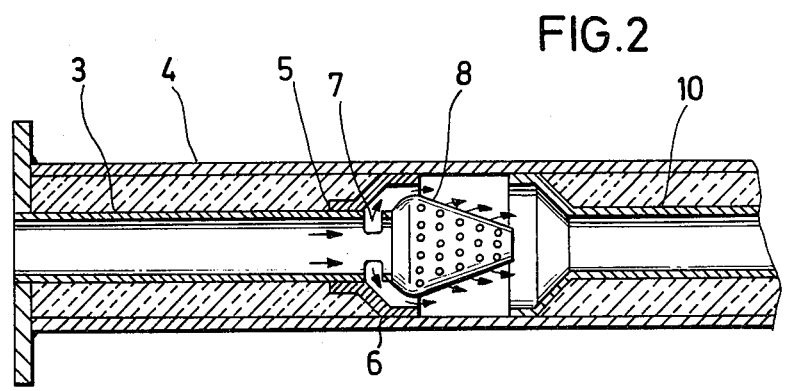
FIG. 2 shows the same arrangement in hot operating condition.

In a modification of the embodiment shown by way of example in FIGS. 1 and 2, the funnel-shaped member 6 might be attached to the exhaust pipe 10, this unit being slidably arranged in the outer pipe 4, and fixed to the outer pipe only at its right-hand end as viewd in the drawing. In that case, the inner pipe 3 and the unit consisting of the funnel-shaped part 6 and the exhaust pipe 10 would shift in opposite directions by heat expansion, so that a greater relative displacement would occur in the vicinity of the orifices 7 and the cylindrical continuation 5.

In the embodiment of FIGS. 3 and 4, the thermal exhaust reactor 1' is combined with a catalytic afterburning system 11. In the cold condition of reactor 1', the inlet pipe 12 of catalyst 11 is in communication with the inner pipe by way of an opening 13 in the wall of the inner pipe 3', while the orifices 7' are covered by the cylindrical continuation 5'. The right-hand end of inner pipe 3' terminates in a flange 14. The exit pipe 15 of catalyst 11 is connected to the exhaust pipe 10'. In th cold condition of the exhaust reactor 1', all the exhaust flows through inner pipe 3' and inlet pipe 12 to the catalyst 11 and thence through exit pipe 15 to exhaust pipe 10'. When the inner pipe 3' has been sufficiently heated by the exhaust so that thermal afterburning can take place, the inner pipe 3'; has lengthened sufficiently to the right so that the orifices 7' are clear of the cylindrical continuation 5', and the exhaust can now flow through said orifices 7' to the exhaust pipe 10'. At the same time, the mouth of inlet pipe 12 is covered by inner pipe 3'. Thus, the catalyst 11 is completely shut off, lengthening its life and reducing the flow resistance of the system.

Figure 5:
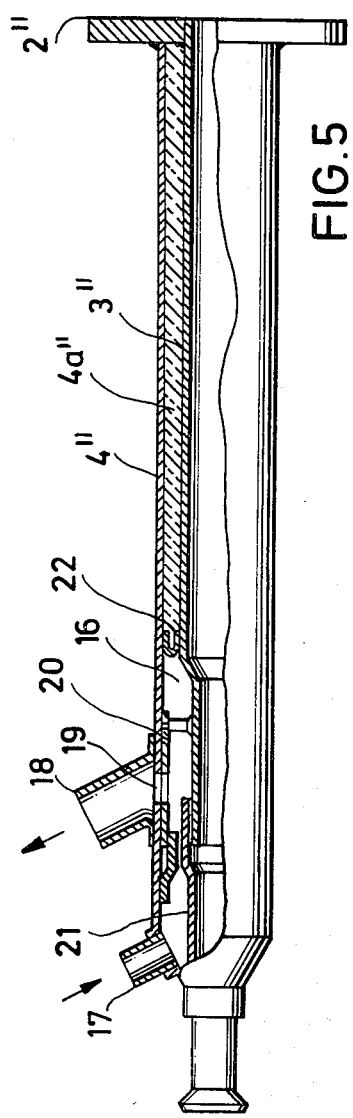
FIG. 5 shows an intake air heating means with a control means, in cold condition.
Figure 6:
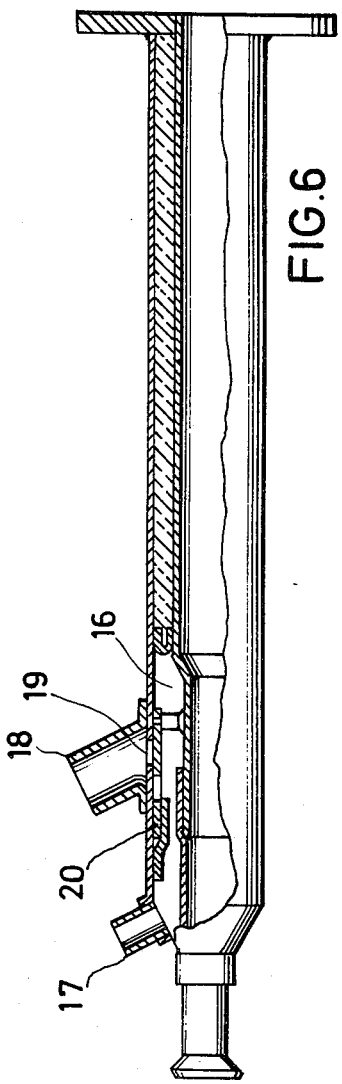
FIG. 6 shows the arrangement of FIG. 5 in hot condition.

FIGS. 5 and 6 show an arrangement, combined with the exhaust system, for heating the intake air of the engine. The exhaust system, much as in the previous examples, has an inner pipe 3" and a jacket pipe 4" surrounding it, fixed at their engine ends to a flange 2" attached to the engine housing. Inner pipe 3" together with outer pipe 4" bounds an annular preheating chamber 16, communicating through a connection 17 with the atmosphere and through a connection 18 with the intake air filter, not shown, of the engine.

The port 19 of connection 18 is controlled by a slide 20 fastened to the inner pipe 3". So long as the inner pipe 3" has not yet reached operating temperature (FIG. 5), slide 20 leaves the port 19 clear, so that the engine takes in air, heated on the already hot inner pipe 3", through the annular chamber 16. When the inner pipe 3" has reached a certain temperature, it has lengthened sufficiently to the left in the drawing so that the slide 20 reaches the position shown in FIG. 6, where the port 19 is closed off. The engine then takes in air only direct from the atmosphere as usual.

In order to keep the exhaust from leaking into the annular chamber 16 insofar as possible, the left-hand end of inner pipe 3" has a sliding fit in an exhaust pipe 21 fixed to the outer pipe 4". Between outer pipe 4" and inner pipe 3", as in the previous example, insulation 4a is provided, its left-hand end being bounded by a wall 22 fixed to the outer pipe 4' and forming a slide bearing for the inner pipe 3'.

In a modification of the embodiment shown in FIGS. 5 and 6, the slide 20 may also be employed to govern the inlet connection 17, that is, connection 17 and 18 may be interchanged, without altering the mode of operation of the device.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. An exhaust system for an automotive internal combustion powerplant comprising; an inner pipe and an outer pipe longitudinally displaceable relative to each other, which pipes are parts of a thermal reactor and are thrust one into the other upon heating, a control means having two parts, one part being a segment of the inner pipe and the other part being attached to the outer pipe, the control means defining a throttling zone for the exhaust gases passing through the inner pipe, the cross-section of the throttling zone enlarging with rising temperature and consequent relative displacement of the pipes, a by-pass line provided with a catalytic afterburning means and connected to the outer pipe and in communication with the inner pipe ahead of the throttling zone in the direction of exhaust gas flow by way of orifices in the wall of the inner pipe, said orifices being increasingly throttled down with rising temperature of the inner pipe and consequent movement thereof relative to the by-pass line.

* * * * *